May 20, 1930. W. L. WARD 1,758,990

METHOD OF MAKING NUTS

Filed July 9, 1924

INVENTOR
William L. Ward
BY
Duell, Anderson & Duell
ATTORNEYS

Patented May 20, 1930

1,758,990

UNITED STATES PATENT OFFICE

WILLIAM L. WARD, OF PORT CHESTER, NEW YORK, ASSIGNOR TO RUSSELL, BURDSALL & WARD BOLT AND NUT COMPANY, OF PORT CHESTER, NEW YORK, A CORPORATION OF NEW YORK

METHOD OF MAKING NUTS

Application filed July 9, 1924. Serial No. 724,925.

This invention relates to the manufacture of metal nuts and with respect to its more specific features to method of making nuts mainly by pressure as distinct from cutting.

One of the objects of the invention is the provision of a practical method of the character referred to and wherewith objectionable features otherwise attendant on or flowing from pressure methods are largely eliminated.

Another object is the provision of a practical method of the character referred to wherewith the number of operations in making the completed nut from a nut blank is greatly reduced.

Another object of the invention is the provision of a method of the character referred to wherewith the probability of error in respect to size or shape of the completed nut is largely obviated.

Another object of the invention is the provision of an improved method of the character referred to wherein the operation of forming the bolt opening participates more effectively in giving ultimate shape and effective density to the nut so that a strong nut may be made in a few operations.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

Figure 1:
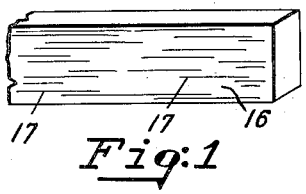
Figure 2:
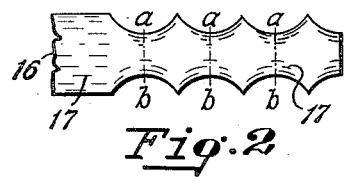
Figure 3:
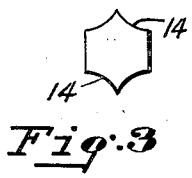
Figure 4:
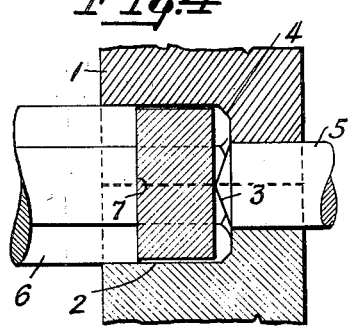
Figure 8:
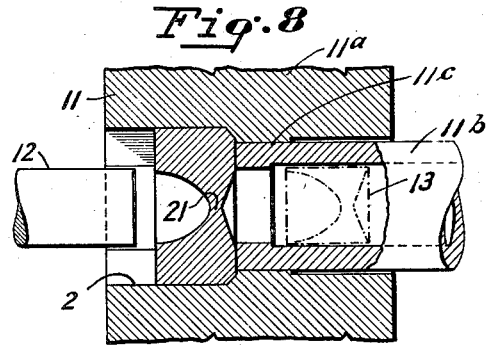
Figure 5:
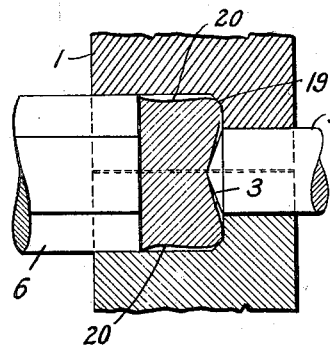
Figure 9:
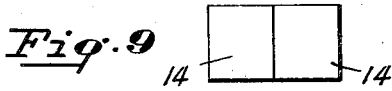
Figure 14:
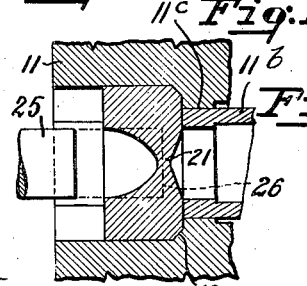
Figure 10:
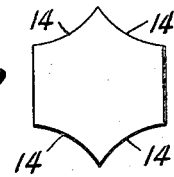
Figure 6:
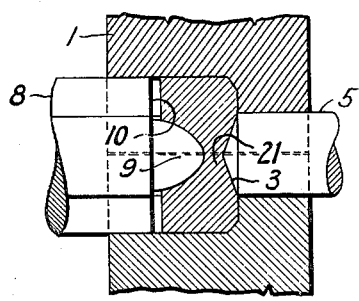
Figure 11:
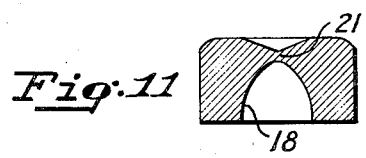
Figure 12:
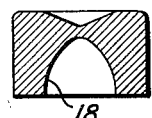
Figure 7:
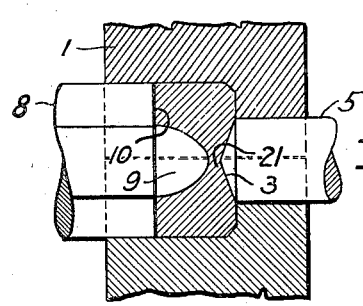
Figure 13:
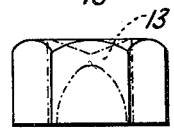

In the accompanying drawings forming part of this specification and wherein similar reference characters refer to similar parts throughout the several views, Figure 1 is a perspective view of a stock bar from which the nuts may be made, the horizontal fine lines indicating direction of the grain, Fig. 2 is a side view of such bar after recesses, as the concavities have been pressed therein, Fig. 3 is a side view of an unpunctured nut blank, Fig. 4 is a sectional view showing a nut blank in an open die, or confining medium, in which the nut may be partly made, Figs. 5, 6 and 7 illustrate the same die at different stages of the method of making the nut, Fig. 8 is a sectional view of a solid die in which a bolt opening in the nut coming from the other die may be completed, Fig. 9 is a side elevation of a generally hexagonal nut blank, Fig. 10 is a bottom view of Fig. 9, Fig. 11 is a cross-section of a nut, taken through the corners of the nut, finished except for the bolt opening, Fig. 12 is a sectional view similar to Fig. 11, but taken through the centre of the sides, Fig. 13 illustrates a completed nut in side elevation, and shows the removed slug in dotted lines, and Fig. 14 is a longitudinal central sectional view of a die corresponding to the die 11 of Fig. 8, but diagrammatically illustrating an arrangement for pressing operation, which may be performed therein prior to the cutting operation which sizes the bolt opening and cuts out and discharges the plug.

One aspect of the invention has in view the development of the nut to exterior size and shape in a single placement of the nut blank, the nut being completed in said single placement, save for the bolt opening, and the bolt opening being at the same time so far developed that it may thereafter, in one or two simple operations, be completed and brought to size without impairing the finished character of the exterior shape and contour of the product coming from the placement referred to.

Another aspect of the invention concerns the character and relation of the pressing operations and their relation to the blank whereby the metal of the blank is efficiently and economically utilized, and rapid development of the nut to exterior size and shape quickly effected and the bolt opening so far advanced that completion of the finished nut may be effected without trimming other than may be required to size the bolt opening.

The method will be more readily understood by a brief description of apparatus which may be employed to carry it out, the apparatus illustrated being that suitable for the making of hexagonal crowned nuts. It is to be understood, however, that the method may be practiced for the manufacture of rectangular or other shaped nuts, and that in respect to some features, uncrowned nuts may be made. The numeral 1, (Fig. 4) indicates a cup die having sides 2 which cooperate to give shape and peripheral dimension to the sides of the nut to be made. This die is of the open type, i. e., it is made in sections separable from each other, the sections being closed to form the operative die. But the sections may be separated in directions transverse to the longitudinal axis to relieve the grip on an enclosed blank so as to permit the free discharge of the blank. When this die is closed the exterior outline of its cross-section is operatively the same as that of the finished nut. The crown end of the die comprises the centrally located taper face 3 and the laterally crowning face 4. The centrally located face 3, in the present embodiment, is provided by the inner end of a tool, or pin 5. This pin is stationary during the shaping operations on the blank in the die 1 and in effect becomes a part of the crown end of the die. This pin may be projected inwardly of the die to discharge the blank therefrom after the die is opened. Thereupon the pin may be restored to its original position as a part of the crown end of the die. As illustrated the pin 5 is cylindrical in cross-section and the face 3 conical with a slightly rounded apex. The diameter of this pin is slightly smaller than that of the bolt opening ultimately to be formed in the finished nut. The numeral 6 indicates a rod, or pressing tool, the flat front end 7 of which is adapted to press against the blank in the die. The cross-section of the front end of the pressing tool 6 is the same as that of the die and closely fits therein. In Figs. 4 and 5, the tool 6 is illustrated in two different positions.

The numeral 8 indicates a second rod also adapted closely to fit the die 1 and having a taper tool 9 centrally disposed on its front end. As illustrated the contour or shape of this tool 9, is generally similar to that of a teat punch and is different from that of the end 3 of the pin 5. At the base of the teat 9, and surrounding the latter is a pressing face 10 formed by the flat end face of the rod 8. Figs. 6 and 7 illustrate two different positions of the rod 8.

Referring now to Fig. 8, the numeral 11 indicates a second die, which may be termed a finishing die. In practice the die 11 is preferably of the solid type. Being the finishing die, it is much to be desired that the surface of the nut blank operated upon therein shall not be defaced by the sides or end of the die and such object is conserved by the provision of a solid die. The blank which has been shaped in the open die 1 above referred to may be introduced into the solid die 11 and the nut completed, save for tapping. The solid die 11 is of such size and shape that the partly finished blank coming from the open die 1 may be closely seated and supported at its sides and crown end except for the portion of the blank which is to be removed by the punch 12. The central portion of the head of die 11 is open to cooperate with the punch 12 and permit passage of the slug 13 punched out by the punch 12. In Fig. 8 the numeral 13 illustrates a slug which has been removed from a prior nut blank by operation of the punch 12.

In practice, it is preferred to make the die 11 in two separable parts, as for example, a stationary containing or shaping part 11$^a$, and a core die 11$^b$. The latter fits accurately into and slides within an opening 11$^c$ coaxial with the nut. During the punching operation, the core die is held rigidly in the containing die until the slug 13 has been punched from the nut. Thereafter the core die may be caused to slide within the containing die toward the nut to eject the nut from the containing die.

In practicing the method, a nut blank is employed which contains sufficient metal to compose the completed nut and which is of a cross-section generally similar to that of the completed nut but smaller. Whe practicing the method for the making of hexagonal nuts, the sides of the blank are indented or pressed inwardly, as for instance indicated at 14, Fig. 10, before being introduced into the die 1. When such a blank is introduced into the die 1, the corners of the blank will lie fairly close to the corners of the die, whereas the sides of the blank will be spaced from the sides of the die to the extent provided by the recessed or concaved, faces of the blank. On account of the relation of the corners of the blank to the corners of the die, movement of the blank in the die 1 as the tool 6 advances, is a centered one, i. e. the longitudinal axis of the blank will practically coincide with the longitudinal axis of the die. As the pressing end 7 of the rod or presser 6 is forced inwardly, the taper face 3 of the tool or pin 5 will be forced against the crown end of the finished blank so as to sink the central portion of this end and partially develop the nut. Some of the metal of the blank will be displaced inwardly from the flat surface of the crown end of the blank and some will be displaced laterally on account of the taper character of the face 3. Furthermore the lateral portion of the crown end of the blank, that is, the portion surrounding the sunk part, will be forced toward the lateral portion of the crown end of the die, and upon making contact with the latter, the crown will be initiated by the compressive longitudinal pressure on the lateral portion of the blank with the result that the metal of the lateral part of the crown end of the blank will be shaped on account of this compressive pressure and this shaping will take place simultaneously with the sinking operation on the crown end. The sink in the crown end may be made relatively shallow so that there shall be sufficient metal adjacent the sink for inclusion in the completed crown upon a subsequent sinking operation being performed on the bottom end of the blank as will be explained. It will thus be seen that the sinking operation on the crown end of the blank may be carried to such an extent as to displace a relatively small portion of the metal longitudinally and laterally, and that the amount of crowning accomplished consequent on the displacement of metal and the pressure from this sinking operation is variable. Crowning may be more or less completed by varying the dimensions and amount of penetration of the taper face 3. It has been found in practice that the blank takes the approximate shape illustrated in Fig. 5 in which the sink is partially, if not wholly, completed. The crown may have been initiated as indicated at 19 (Fig. 5) and the sides of the blank have become inwardly bowed longitudinally of the blank, as indicated at 20, the ends of the bow having approached the sides of the die, or confining medium.

The pressing operation of the tool 6 having been completed, said tool is withdrawn from the die 1 and replaced by the tool 9, alongside which is the pressing face 10 of the rod 8. As illustrated the tool 9 is of greater displacing effect than the pin 5 and in practice it is carried to a greater depth in the blank than is the pin 5. Upon moving the rod 8 into the die, the partially developed nut, which is still in the die and has not been removed after the described action thereon by the tool 6, is strongly pressed toward the crown end of the die and the taper teat 9 cooperates to further develop the already partially developed nut by crowding the metal of the blank both forwardly and laterally, forming a sink in the bottom face of the blank, and displacing the metal of the blank in a uniform manner so as strongly to force the lateral faces or sides of the blank against the shaping medium, or sides, of the die, the bowing of the sides of the blank, as at 20, being eliminated, and said sides being forced closely to conform to the sides of the die. Should the crown not have been perfected by the pressing operation due to the first tool 6, the crown will be completed in consequence of the operation of the teat 9. Formation of the sink 18 in the bottom face of the blank also further develops the bolt opening, and a web of metal 21, Figs. 6 and 7, may, and usually will, be left between the two opposite sinks.

Should the lateral portion of the bottom of the blank around the sunken part require shaping, as flattening, the surrounding face 10 of the pressing rod 8 will effect the same. It is found in practice that the unconfined metal between the teat 9 and the sides of the die extrudes longitudinally outwardly of the die. By carrying the sinking operation in the bottom far enough, the flat face 10 of the rod 8 counter-presses this lateral extruded portion and not only flattens the lateral portion of the bottom of the blank but also cooperates to compress this lateral portion to the required plane to give the finished length for the nut and avoid formation of fins extending between the rod 8 and the sides of the die.

It will be observed that on account of the lateral displacement by reason of the pressure consequent from the nut developing sinking operations, particularly that on the bottom of the blank, the metal of the blank will be forced to flow and the blank caused to expand laterally, its sides being forced into close contact with the sides of the shaping medium, or die. It is found in practice that the side faces and crown of the blank are finished to satisfactory commercial condition by these operations, except possibly for some washing which may be subsequently performed.

The punching operation being performed upon a completely formed nut as shown in Fig. 8, shears out the slug without distortion of the nut and leaves the completed nut accurately formed to size, both inside and out. This nut can then be readily ejected from the containing die by movement of the core die.

The method is suitable for making nuts of a variety of cross-sections but lends itself especially readily to the production of hexagonal nuts because the corners of the blanks readily cooperate with the corners of the die to center the blanks transversely in the die so that the sinking operations may be initiated on substantially the central longitudinal axis of the blank. When a square nut is to be formed the square blank may be centered by cooperation with the inclined lateral crowning walls of the square die preliminary to making the sink in the crown end thereof.

Notwithstanding the simplicity of the method very efficient nuts may be speedily made in a few operations. Except for finishing the bolt opening the nut is completely made by pressing operations engendered by blows or punches, no outside trimming being required. The only waste is the slug removed in punching the bolt opening and as this slug is but a small part of the original blank the waste is fairly negligible. When the partly formed nut comes from open die 1, its sides, crown and bottom are true relatively to each other, so that the last operation is the punching of the bolt opening. As no subsequent shaping operation is required, the bolt opening may be made exact as to size and direction with assurance that it will so remain in the finished nut.

The sinking may readily be effected so as to displace the metal symmetrically laterally with the result that the lateral metal of the nut will be compacted and strengthened by its increased density uniformly distributed around the periphery of the nut. The working of the metal results in giving bright sides and crown to the nut so that it has a finished appearance.

In the better practice the blanks employed in practicing the method herein disclosed are relatively soft, fibrous, low carbon steel. Advantageous results are obtained when the grain of the fiber runs transversely of the blank, that is from side to side thereof. To obtain such blanks efficiently and economically they may be punched from a rectangular steel bar 16, Fig. 1, in which the grain runs longitudinally as indicated at 17. Also the concave faces 14 of the hexagonal blanks may be produced by indenting, or pressing inwardly, the narrower edges of the bar 16 to concave shape as diagrammatically illustrated in Fig. 2. Thereupon the blanks may be severed in succession from the bar 16 along the lines *a—b*. It will be observed that when the concavities of the bar of Fig. 2 are made by compressing the fibers adjacent the surface, the fibers are compacted and bent without destroying the strength of this part of the resultant blank, and it will be further noted that the disturbance of these fibers under the sinking operations of the tools 3 and 9 is such as to displace them laterally with practically no tendency to break the fibers. The recessing of the sides of the blank, as above explained, promotes development of hexagonal nuts of uniform efficient density throughout. It is to be understood however that the invention is not to be limited to the recessing described and that good results may be obtained from blanks having flat sides, as for instance in the making of square nuts.

Although a satisfactory nut may be completed in the die 11 by operation of the punch 12 which punches out the slug and trims the bolt opening to the size desired, it is possible to further densify and strengthen the nut by an additional nut developing operation in the die 11 prior to said trimming and discharge of the slug. To this end before the application of the sizing and cutting punch 12, a cylindrical punch 25 (Fig. 14) may be applied to the blank in the die 11 in alignment with the longitudinal axis of the blank. The front face of the punch 25 is of such a character as, when in its inner position indicated by the dotted lines 26, to further compress the material of the central portion of the blank so that the thickness of the web of metal of the blank coming from the die 1 is reduced the punch 25 is smaller in diameter than the punch 12 in order that the punch 12 may make a finishing cut throughout the length of the bolt hole in the nut. In consequence of the application of the punch 25, additional metal will be diverted into the lateral body of the blank so as to further augment its density and strength. Following the application of the punch 25, the trimming punch 12 may be applied to size the bolt opening and punch out the slug, as before explained.

It will be observed that in carrying out the method there are included but two placements of the blank, one in the open die 1 and a second in the solid die 11. It will be further observed that the blank is completely exteriorly shaped in the die 1, so that as long as the die functions properly there is no opportunity for successive blanks to vary in dimension or shape. Thus uniformity of exterior shape of successive blanks is assured. It will be further observed that after the exterior shaping in die 1, the bolt openings are completed in the single die 11. The shape and size of the die 11 are the same as the shape and size of the blank coming from the die 1 so that the punching operations effected in die 11 do not alter the exterior configuration or size of the blank.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. The method of making nuts which includes confining a blank in an open die, expanding the blank substantially to the size of the die by superficial pressure while cold and subsequently centrally indenting the bottom of the blank while the lateral portion of said bottom is unconfined and subsequently compressing the periphery.

2. The process of making a nut which comprises confining a blank in an open die and developing the blank to the size of the die by independent blows upon different portions of the blank, including the formation of an indentation almost through the blank, subsequently removing the blank from the die and confining it in a finishing die and perforating it by a pair of punches acting in sequence, the first of which is smaller than the second and second of which is larger than said indentation.

3. The process of forming a nut which comprises forming a blank having an indentation of smaller diameter than the perforation to be made in the nut, punching the blank with a punch about the size of the indentation and subsequently punching with a punch larger than the indentation while the nut is confined in a die.

In testimony whereof I affix my signature.

WILLIAM L. WARD.